(12) United States Patent
Liu et al.

(10) Patent No.: US 11,137,507 B2
(45) Date of Patent: Oct. 5, 2021

(54) NEAR-SEA-BOTTOM HYDRATE DETECTION SYSTEM

(71) Applicants: The First Institute of Oceanography, SOA, Qingdao (CN); National Deep Sea Center, Qingdao (CN); ZHEJIANG University, Hangzhou (CN); Xi'an Hong Lu Yang Electrical Equipment Co., Ltd., Xi'an (CN)

(72) Inventors: Baohua Liu, Qingdao (CN); Yanliang Pei, Qingdao (CN); Kaiben Yu, Qingdao (CN); Yifan Huang, Qingdao (CN); Zili Chen, Qingdao (CN); Guangming Kan, Qingdao (CN); Yanhong Lian, Qingdao (CN); Keping Yan, Qingdao (CN); Chunlei Jing, Qingdao (CN); Le Zong, Qingdao (CN)

(73) Assignee: The First Institute of Oceanography, SOA, Qingdao (CN)

( * ) Notice: Subject to any disclaimer, the term of this patent is extended or adjusted under 35 U.S.C. 154(b) by 679 days.

(21) Appl. No.: 16/060,133

(22) PCT Filed: Aug. 25, 2017

(86) PCT No.: PCT/CN2017/099105
§ 371 (c)(1),
(2) Date: Jun. 7, 2018

(87) PCT Pub. No.: WO2018/209838
PCT Pub. Date: Nov. 22, 2018

(65) Prior Publication Data
US 2021/0003725 A1 Jan. 7, 2021

(30) Foreign Application Priority Data
May 18, 2017 (CN) .......................... 201710352722.7

(51) Int. Cl.
*G01V 1/157* (2006.01)
*G01V 1/38* (2006.01)

(52) U.S. Cl.
CPC ............ *G01V 1/157* (2013.01); *G01V 1/3808* (2013.01); *G01V 1/3835* (2013.01); *G01V 1/3843* (2013.01)

(58) Field of Classification Search
CPC .... G01V 1/3843; G01V 1/3835; G01V 1/157; G01V 1/3808
(Continued)

(56) References Cited

U.S. PATENT DOCUMENTS 6,493,636 B1 * 12/2002 DeKok ................ G01V 1/3861
702/17

FOREIGN PATENT DOCUMENTS

EP 2947481 A1 * 11/2015 ............. G01V 1/284

OTHER PUBLICATIONS

Huang et al., CN 102176051, machine translation, 6 pp. (Year: 2019).*
(Continued)

*Primary Examiner* — Daniel L Murphy
(74) *Attorney, Agent, or Firm* — Troutman Pepper Hamilton Sanders LLP; Christopher C. Close, Jr.

(57) ABSTRACT

The present invention discloses a near-sea-bottom hydrate detection system, which includes a ship-borne part and a deep-towing part. The ship-borne part includes: a comprehensive monitoring host, configured to send an acquisition triggering pulse signal, and transmit the signal to the deep-towing part; and receive near-sea-bottom information acquired by the deep-towing part, and determine a near-sea-bottom condition according to the near-sea-bottom information. The deep-towing part includes: a data acquisition unit, configured to acquire near-sea-bottom information at a cur-
(Continued)

rent position according to the acquisition triggering pulse signal; an electric spark vibration source, configured to generate an electric spark vibration signal according to the acquisition triggering pulse signal; and a multi-channel data-acquisition electronic cabin, connected to the comprehensive monitoring host, the data acquisition unit, and the electric spark vibration source separately, and configured to transmit the acquisition triggering pulse signal to the electric spark vibration source and the data acquisition unit, and transmit the near-sea-bottom information acquired by the data acquisition unit to the comprehensive monitoring host. In this way, the Fresnel radius can be reduced, and the detection resolution can be improved.

10 Claims, 2 Drawing Sheets

(58) Field of Classification Search
USPC .......................................................... 367/21
See application file for complete search history.

(56) References Cited

OTHER PUBLICATIONS

Wang et al., CN 105242321, machine translation, 26 pp. (Year: 2019).*

* cited by examiner

NEAR-SEA-BOTTOM HYDRATE DETECTION SYSTEM

TECHNICAL FIELD

The present invention relates to the field of marine exploration technology, and in particular, to a near-sea-bottom hydrate detection system.

BACKGROUND

Prospection of natural gas hydrate resources is generally based on geological prospecting theories. By comprehensive use of means combining geophysics and geochemistry, deep-towing seismic exploration and in-situ geochemical analysis near the sea bottom are becoming the most effective means. The prospection of hydrate resources in major sea areas of China has gradually entered the stage of detailed investigation and trial mining. A conventional multi-channel seismic system has insufficient resolution, and thus it is difficult to meet the requirement for the detailed depiction of the spatial distribution of ores. An existing geochemical measurement apparatus has poor accuracy, low efficiency, and inability to identify weak anomalies in the ores. In addition, due to the attenuation of acoustic waves (especially high-frequency components) by seawater, the detection resolution and penetration depth of the conventional seismic apparatus for deep-sea strata are reduced. Moreover, the Fresnel radius is large and the resolution is low.

SUMMARY

A purpose of the present invention is to provide a near-sea-bottom hydrate detection system, which can reduce the Fresnel radius and enhance the detection resolution.

To achieve the above purpose, the present invention provides the following solution.

A near-sea-bottom hydrate detection system is provided, which includes a ship-borne part and a deep-towing part, where the ship-borne part includes: a comprehensive monitoring host, configured to send an acquisition triggering pulse signal, and transmit the signal to the deep-towing part; and receive near-sea-bottom information acquired by the deep-towing part, and determine a near-sea-bottom condition according to the near-sea-bottom information; and the deep-towing part includes:

a data acquisition unit, configured to acquire near-sea-bottom information at a current position according to the acquisition triggering pulse signal;

an electric spark vibration source, configured to generate an electric spark vibration signal according to the acquisition triggering pulse signal, to vibrate seawater; and a multi-channel data-acquisition electronic cabin, connected to the comprehensive monitoring host, the data acquisition unit, and the electric spark vibration source separately; and configured to transmit the acquisition triggering pulse signal to the electric spark vibration source and the data acquisition unit, and transmit the near-sea-bottom information acquired by the data acquisition unit to the comprehensive monitoring host.

Alternatively, the electric spark vibration source includes:

a control module, connected to the multi-channel data-acquisition electronic cabin, and configured to output a vibration control signal according to the acquisition triggering pulse signal;

a discharge module, connected to the control module, and configured to discharge electricity under the control of the vibration control signal, to generate the electric spark vibration signal; and an energy storage module, connected to the discharge module, and configured to provide discharge energy to the discharge module.

Alternatively, the electric spark vibration source further includes:

a charging module, connected to the energy storage module, and configured to charge the energy storage module.

Alternatively, the data acquisition unit includes:

a digital receiving cable, connected to the multi-channel data-acquisition electronic cabin, and configured to receive reflection information from near-sea-bottom strata after the seawater is vibrated, and send the reflection information to the multi-channel data-acquisition electronic cabin;

a responder, connected to the multi-channel data-acquisition electronic cabin, and configured to determine current near-sea-bottom position information and send the position information to the multi-channel data-acquisition electronic cabin;

a posture sensor, connected to the multi-channel data-acquisition electronic cabin, and configured to detect a current three-dimensional motion posture of the digital receiving cable and send the motion posture to the multi-channel data-acquisition electronic cabin;

a depth gage, connected to the multi-channel data-acquisition electronic cabin, and configured to measure the depth by which the digital receiving cable submerges near the sea bottom, and send the depth to the multi-channel data-acquisition electronic cabin; and a height gage, connected to the multi-channel data-acquisition electronic cabin, and configured to measure the linear length of the digital receiving cable and send the length to the multi-channel data-acquisition electronic cabin.

The multi-channel data-acquisition electronic cabin is further configured to perform data compilation and arrangement on the reflection information, the position information, the depth, and the linear length, to convert the data into an optical signal.

Alternatively, the deep-towing part further includes:

a photoelectric composite connector, disposed between the multi-channel data-acquisition electronic cabin and the digital receiving cable.

Alternatively, the digital receiving cable includes:

a towrope main body;

a hydrophone array, disposed in the towrope main body at equal intervals, and configured to receive a reflected wave from the near-sea-bottom strata;

a filter amplifier, connected to the hydrophone array, and configured to filter and amplify the reflected wave; and an A/D conversion module, connected to the filter amplifier and the multi-channel data-acquisition electronic cabin separately, and configured to convert an analog signal of the reflected wave processed by the filter amplifier into a digital signal, and send the digital signal to the multi-channel data-acquisition electronic cabin.

Alternatively, the interval set for the hydrophone array is 50 m.

Alternatively, the detection system further includes a towing body, and the deep-towing part is fixed on the towing body, where the towing body includes a main frame, a diversion hood and balancing tail fins;

the diversion hood is disposed on the head end of the main frame, the electric spark vibration source is disposed inside the main frame, and the balancing tail fins are separately disposed on two sides of the tail end of the main frame; and the data acquisition unit is disposed inside the diversion hood.

Alternatively, the ship-borne part further includes: a GPS navigation unit, an ultra-short base line positioning unit, a storage unit, and a display array, where the GPS navigation unit, the ultra-short base line positioning unit, the storage unit, and the display array are separately connected to the comprehensive monitoring host.

Alternatively, the detection system further includes:

a photoelectric composite towrope, disposed between the comprehensive monitoring host and the data acquisition unit, and configured to perform information interaction.

According to specific embodiments provided in the present invention, the present invention discloses the following technical effects:

In the near-sea-bottom hydrate detection system of the present invention, by disposing a data acquisition unit, an electric spark vibration source, and a multi-channel data-acquisition electronic cabin in a deep-towing part, near-sea-bottom information at a position near the sea bottom can be detected, reducing the Fresnel radius on a target layer. In addition, the ambient noise near the sea bottom is low, and thus a signal-to-noise ratio can be enhanced. In this way, by disposing a comprehensive monitoring host in a ship-borne part, a near-sea-bottom condition can be accurately determined, thus improving the detection resolution of distribution of hydrate minerals.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

Figure 1:
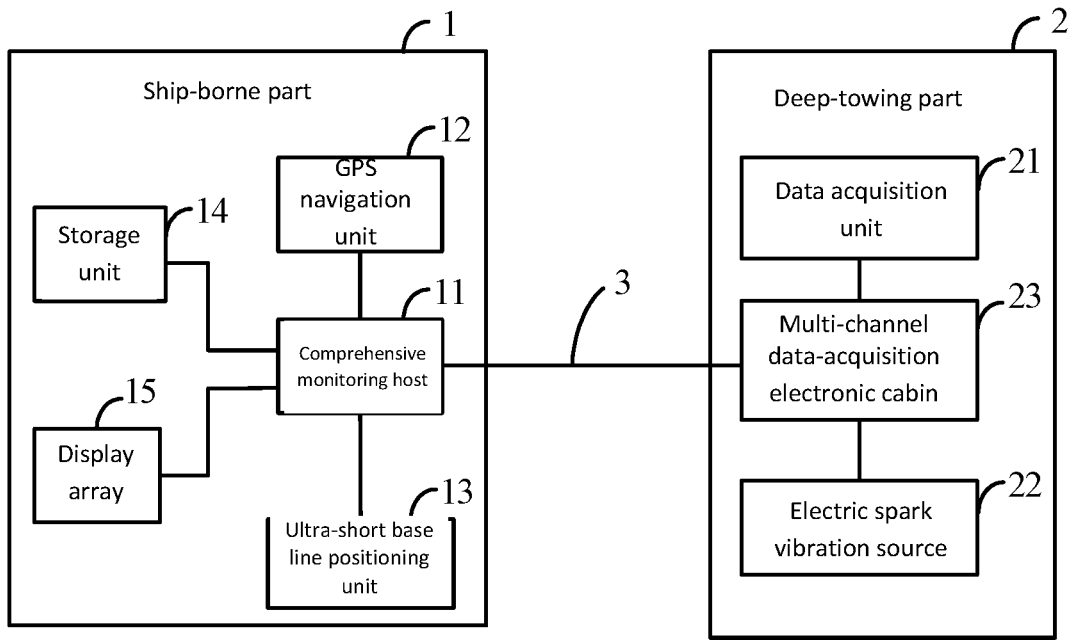
FIG. 1 is a schematic structural diagram of modules of a near-sea-bottom hydrate detection system according to an embodiment of the present invention.

REFERENCE NUMERAL DESCRIPTION 1. ship-borne part, 11. comprehensive monitoring host, 12. GPS navigation unit, 13. ultra-short base line positioning unit, 14. storage unit, 15. display array, 2. deep-towing part, 21. data acquisition unit, 210. responder, 211. depth gage and height gage, 212. photoelectric composite connector, 213. electrical junction box, 22. electric spark vibration source, 220. main control circuit board, 221. IGBT thyristor, 222. switch trigger, 223. discharge switch, 224. discharge electrode, 225. energy storage capacitor, 226. transformer, 227. AD/DC converter, 228. resonance circuit, 229. filter capacitor, 23. multi-channel data-acquisition electronic cabin, 3. photoelectric composite towrope, 41. main frame, 42. diversion hood, and 43. balancing tail fins.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A purpose of the present invention is to provide a near-sea-bottom hydrate detection system. By disposing a data acquisition unit, an electric spark vibration source, and a multi-channel data-acquisition electronic cabin in a deep-towing part, near-sea-bottom information at a position near the sea bottom can be detected, reducing the Fresnel radius on a target layer. In addition, the ambient noise near the sea bottom is low, and thus a signal-to-noise ratio can be enhanced. In this way, by disposing a comprehensive monitoring host in a ship-borne part, a near-sea-bottom condition can be accurately determined, thus improving the detection resolution of distribution of hydrate minerals.

To make objectives, features, and advantages of the present invention more comprehensible, the following describes the present invention in more detail with reference to accompanying drawings and specific implementations.

As shown in FIG. 1, the near-sea-bottom hydrate detection system of the present invention includes a ship-borne part 1 and a deep-towing part 2. The ship-borne part 1 and the deep-towing part 2 are connected via a photoelectric composite towrope 3, to implement information interaction.

The ship-borne part 1 includes a comprehensive monitoring host 11, a GPS navigation unit 12, an ultra-short base line positioning unit 13, a storage unit 14, and a display array 15. The GPS navigation unit 12, the ultra-short base line positioning unit 13, the storage unit 14, and the display array 15 are separately connected to the comprehensive monitoring host 11. The monitoring host 11 is configured to send an acquisition triggering pulse signal, and transmit the signal to the deep-towing part 2; and receive near-sea-bottom information acquired by the deep-towing part 2, and determine a near-sea-bottom condition according to the near-sea-bottom information.

The deep-towing part 2 includes: a data acquisition unit 21, an electric spark vibration source 22, and a multi-channel data-acquisition electronic cabin 23. The data acquisition unit 21 acquires near-sea-bottom information at a current position according to the acquisition triggering pulse signal. The electric spark vibration source 22 generates an electric spark vibration signal according to the acquisition triggering pulse signal, to vibrate seawater. The multi-channel data-acquisition electronic cabin 23 is connected to the comprehensive monitoring host 11, the data acquisition unit 21, and the electric spark vibration source 22 separately; and transmits the acquisition triggering pulse signal to the electric spark vibration source 22 and the data acquisition unit 21, and transmits the near-sea-bottom information acquired by the data acquisition unit 21 to the comprehensive monitoring host 11.

The data acquisition unit 21 includes: a digital receiving cable, a responder, a posture sensor, a depth gage, and a height gage. The digital receiving cable, the responder, the posture sensor, the depth gage, and the height gage are separately connected to the multi-channel data-acquisition electronic cabin 23. The digital receiving cable receives reflection information from near-sea-bottom strata after the seawater is vibrated, and sends the reflection information to the multi-channel data-acquisition electronic cabin. The responder determines current near-sea-bottom position information and sends the position information to the multi-channel data-acquisition electronic cabin. The posture sensor detects a current three-dimensional motion posture of the digital receiving cable and sends the motion posture to the multi-channel data-acquisition electronic cabin. The depth gage measures the depth by which the digital receiving cable submerges near the sea bottom, and sends the depth to the multi-channel data-acquisition electronic cabin. The height gage measures the linear length of the digital receiving cable and sends the length to the multi-channel data-acquisition electronic cabin. The multi-channel data-acquisition electronic cabin is further configured to perform data compilation and arrangement on the reflection information, the position information, the depth, and the linear length, to convert the data into an optical signal. Further, the deep-towing part 2 further includes a photoelectric composite connector 212, which is disposed between the multi-channel data-acquisition electronic cabin 23 and the digital receiving cable. In this embodiment, the responder is a USBL responder.

Specifically, a main interface disposed on the multi-channel data-acquisition electronic cabin 23 includes five 232 serial ports, where one is connected to the USBL responder, one is connected to the height gage, one is connected to the depth gage, the remaining two are internally reserved. An optical-fiber hybrid interface is connected to an electrical junction box 213, for power supply, control of the electric spark vibration source 22, communication, and the like. The photoelectric composite connector 212 is connected to the digital receiving cable, and includes two LVDS6-type twisted pairs, two power lines, two ground wires, and two water bird lines, to implement centralized power supply to the acquisition unit, command sending, and receiving of acquired data. A transmission manner of the data and command is defined in a long-distance self-defined protocol LVDS.

The comprehensive monitoring host receives multi-channel seismic data (that is, information about a reflected wave), posture data, height data and depth data that are uploaded by the deep-towing part; and dispenses the multi-channel seismic data to the storage unit 14 and the display array 15, such that the storage unit 14 processes the data in real time and the display array 15 displays the data. The comprehensive monitoring host dispenses the posture data to a position posture inversion unit (not shown in the figure). The position posture inversion unit parses the posture data to obtain a carrier posture, and then simulates and draws an operation status of a towrope in a three-dimensional direction. That is to say, in addition to receiving acquired valid data, the comprehensive monitoring host further receives the depth of the digital receiving cable, the linear length of the digital receiving cable, an interval between acquisition units of the digital receiving cable, and a degree of deviation of the digital receiving cable from a tug track.

Specifically, the digital receiving cable includes a towrope main body, a hydrophone array, a filter amplifier, and an A/D conversion module. The hydrophone array is disposed in the towrope main body at equal intervals, and configured to receive a reflected wave from the near-sea-bottom strata. The filter amplifier is connected to the hydrophone array, and configured to filter and amplify the reflected wave. The A/D conversion module is connected to the filter amplifier and the multi-channel data-acquisition electronic cabin separately, and configured to convert an analog signal of the reflected wave processed by the filter amplifier into a digital signal, and send the digital signal to the multi-channel data-acquisition electronic cabin. Preferably, the interval set for the hydrophone array is 50 m, three segments are set in total, and the overall length is 150 m. The hydrophone array is set in a manner of 5 per channel. The A/D conversion module has 32 bits.

In addition, the digital receiving cable further includes an array interval monitoring module, an array depth control module, and a data transmission node module. The array interval monitoring module is configured to monitor an array interval of the hydrophone array, and send the array interval to the multi-channel data-acquisition electronic cabin, such that the multi-channel data-acquisition electronic cabin can perform arrangement according to the monitored hydrophone array condition. The array depth control module is configured to control an arrangement depth of the hydrophone array. The data transmission node module includes multiple transmission nodes, where each transmission node is used to transmit a group of data.

In the real marine environment, there are various kinds of interference. The towrope main body often deviates from the expected depth and horizontal position due to its own buoyancy, sea waves, currents, and other reasons. Such deviation reduces the quality of data acquired by a sea-bottom high-resolution seismic exploration system. However, when the operation is performed offshore at the depth of 2000 m, the sea waves slightly affect the towrope, but the buoyancy of the towrope and transverse currents have a severe impact on the posture of the towrope. In order to enhance the detection resolution, the digital receiving cable further includes a detection module embedded into the towrope main body, to measure the posture of the digital receiving cable. Further, in the subsequent processing of seismic data, acquired seismic data is rectified using the posture information, thus improving the quality of seismic profile data.

Further, the electric spark vibration source includes a control module, a discharge module, an energy storage module, and a charging module. The control module is connected to the multi-channel data-acquisition electronic cabin, and configured to output a vibration control signal according to the acquisition triggering pulse signal. The discharge module is connected to the control module, and configured to discharge electricity under the control of the vibration control signal, to generate an electric spark vibration signal. The energy storage module is connected to the discharge module, and configured to provide discharge energy to the discharge module. The charging module is connected to the energy storage module, and configured to charge the energy storage module.

The electric spark vibration source is an electric spark vibration source working under a high hydrostatic pressure. In this embodiment, the energy of the electric spark vibration source is 2000 J. Specifically, the 2000 J electric spark vibration source implements acquisition control of high-precision data, real-time high-speed transmission, and monitoring and tests; and has a function of assisting in peripheral intelligence support and a transmission communication function. Maintenance, function expansion, and version upgrade of the software are easily implemented. The monitoring and tests are implemented by using system test software, fault diagnosis software, hydrophone overall performance analysis software, and the like.

Figure 2:
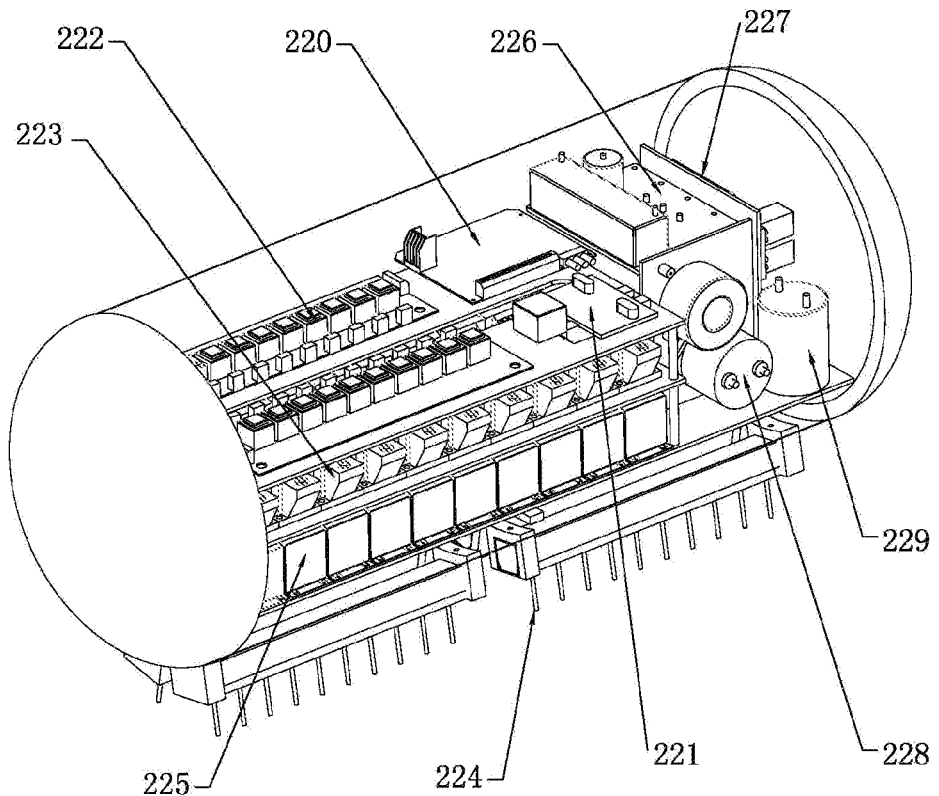
FIG. 2 is a structural diagram of an electric spark vibration source of a near-sea-bottom hydrate detection system according to an embodiment of the present invention.
Figure 3:
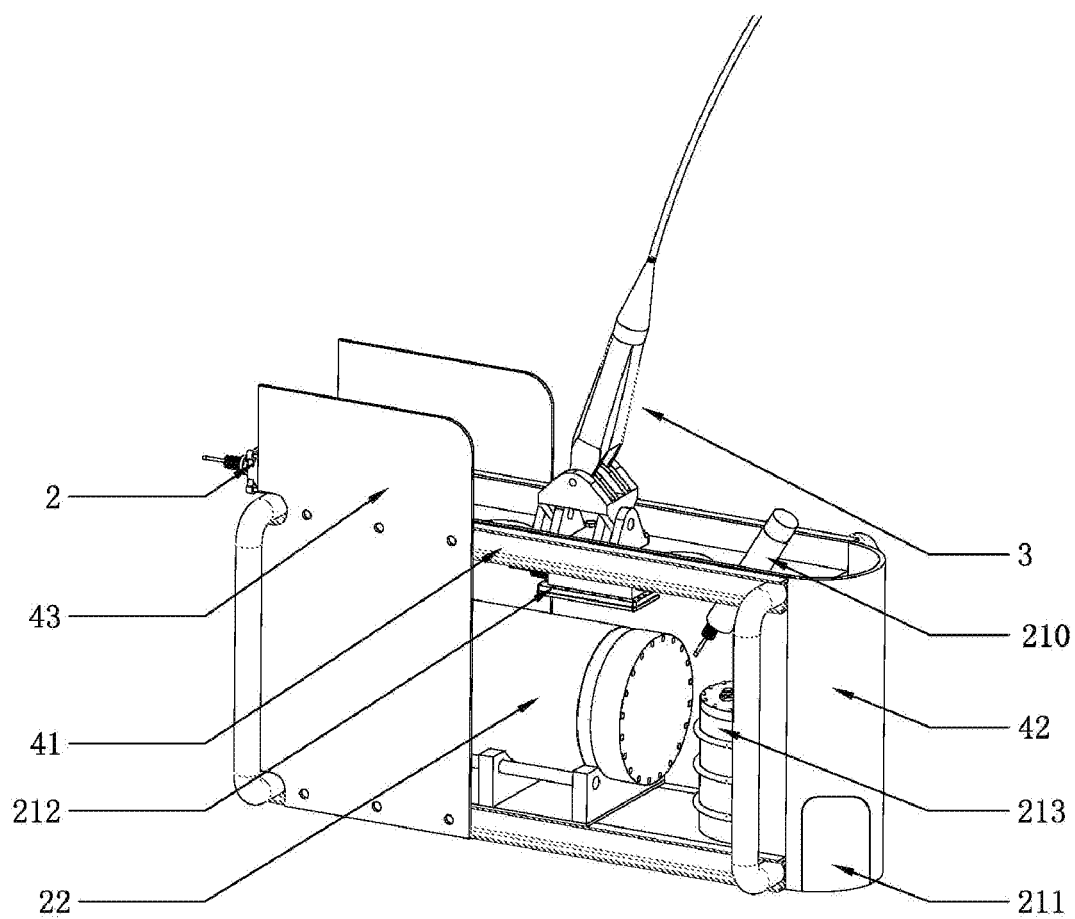
FIG. 3 is an assembly connection diagram of a towing body and a deep-towing part.

As shown in FIG. 2, the control module includes a main control circuit board 220 and an IGBT thyristor 221. The IGBT thyristor 221 is turned on after receiving the acquisition triggering pulse signal, and the main control circuit board 220 starts to work. The discharge module includes a switch trigger 222, a discharge switch 223, and a discharge electrode 224. Under the control of the main control circuit board 220, the switch trigger 222 is triggered, the discharge switch 223 is turned off, and the discharge electrode 224 starts to discharge. The charging module includes a transformer 226, an AD/DC converter 227, a resonance circuit 228, and a filter capacitor 229. An external power source provides an alternating-current voltage through the transformer 226, and the AD/DC converter 227 uses the alternating-current voltage to perform alternating/direct current conversion, to obtain a direct-current voltage. Further, the resonance circuit 228 and the filter capacitor 229 eliminate an interference signal, to input the direct-current voltage into the energy storage module for charging. In this embodiment, the energy storage module may be an energy storage capacitor 225.

In a preferred solution, the near-sea-bottom hydrate detection system of the present invention further includes a towing body, and the deep-towing part is fixed on the towing body. Specifically, the towing body includes a main frame 41, a diversion hood 42 and balancing tail fins 43. The diversion hood 42 is disposed on the head end of the main frame 41, the electric spark vibration source 22 is disposed inside the main frame, and the balancing tail fins 43 are separately disposed on two sides of the tail end of the main frame 42. The data acquisition unit 21 is disposed inside the diversion hood 42, where specifically, the depth gage and the height gage 211 are disposed therein. The USBL responder is fixedly disposed on the main frame. A connection port of the data acquisition unit 23 is disposed on the tail end of the main frame. The main frame 41 uses a material combining a stainless steel sheet and a bar stock, which ensures sufficient rigidity and corrosion resistance, and further has desirable machining performance.

The structure of the towing body is designed to be a semi-open type, and the towing body is transparent from top to bottom, thus improving the stability of its deployment and recovery process.

Further, in the present invention, an auxiliary support frame is designed based on the main frame and fixed on the main frame, and is used to help support an apparatus carried by the towing body, thus providing many possibilities for towing transportation, apparatus carrying, etc. A deep-towing body positioning system is set based on an ultra-short base line, the height gage, and the depth gage. The apparatus is fixed on the main frame of the towing body. A relevant weak-current signal is transferred to a data processing unit on the towing body, and is finally delivered to the ship-borne part.

During an actual operation, the system of the present invention uses a combination of ship-based GPS, a ship-based electronic compass, sonar secondary positioning, towrope node posture detection, and a depth sensor, to accurately determine the position of the towrope main body, and further complete precise detection of the towrope depth and operation posture.

Compared with a traditional sea-surface towing seismic detection system, the near-sea-bottom hydrate detection system of the present invention is closer to a target layer, thus reducing the Fresnel radius on the target layer, and greatly improving the detection resolution, especially, transverse resolution, of the sea-bottom strata. In addition, the ambient noise near the sea bottom is low, and thus a signal-to-noise ratio can be enhanced and the spatial distribution of hydrate ores can be more effectively depicted in detail.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A near-sea-bottom hydrate detection system, comprising a ship-borne part, a towing body, and a deep-towing part, wherein the ship-borne part comprises a comprehensive monitoring host, configured to send an acquisition triggering pulse signal, and transmit the signal to the deep-towing part; and receive near-sea-bottom information acquired by the deep-towing part, and determine a near-sea-bottom condition according to the near-sea-bottom information; and the deep-towing part comprises:
a multi-channel data-acquisition electronic unit;
a data acquisition unit configured to acquire near-sea-bottom information at a current position according to the acquisition triggering pulse signal, the data acquisition unit comprising a digital receiving cable connected to the multi-channel data-acquisition electronic unit and configured to (i) receive reflection information from a near-sea-bottom strata when seawater is vibrated and (ii) send the reflection information to the multi-channel data-acquisition electronic unit, the digital receiving cable comprising:
a towrope main body;
a hydrophone array, the hydrophone array (i) disposed in the towrope main body at equal intervals and (ii) configured to receive a reflected wave from the near-sea-bottom strata;
an array interval monitoring module, the array interval monitoring module (i) configured to monitor an array interval of the hydrophone array and (ii) send the array interval to the multi-channel data-acquisition electronic unit such that the multi-channel data-acquisition electronic unit performs arrangement according to a monitored hydrophone array condition; and
an array depth control module configured to control an arrangement depth of the hydrophone array; and
an electric spark vibration source, configured to generate an electric spark vibration signal according to the acquisition triggering pulse signal, to vibrate the seawater,
wherein the multi-channel data-acquisition electronic unit is connected to the comprehensive monitoring host, the data acquisition unit, and the electric spark vibration source separately, and the multi-channel data-acquisition electronic unit is configured to (i) transmit the acquisition triggering pulse signal to the electric spark vibration source and the data acquisition unit and (ii) transmit the near-sea-bottom information acquired by the data acquisition unit to the comprehensive monitoring host, and wherein the deep-towing part is fixed on the towing body and a structure of the towing body is designed to be a semi-open type, and the towing body is transparent from top to bottom.

2. The near-sea-bottom hydrate detection system according to claim 1, wherein the electric spark vibration source comprises:

a control module, connected to the multi-channel data-acquisition electronic unit, and configured to output a vibration control signal according to the acquisition triggering pulse signal;

a discharge module, connected to the control module, and configured to discharge electricity under the control of the vibration control signal, to generate the electric spark vibration signal; and an energy storage module, connected to the discharge module, and configured to provide discharge energy to the discharge module.

3. The near-sea-bottom hydrate detection system according to claim 1, wherein the electric spark vibration source further comprises:

a charging module, connected to the energy storage module, and configured to charge the energy storage module.

4. The near-sea-bottom hydrate detection system according to claim 1, wherein the data acquisition unit further comprises:

a responder, connected to the multi-channel data-acquisition electronic unit, and configured to determine current near-sea-bottom position information and send the position information to the multi-channel data-acquisition electronic unit;

a posture sensor, connected to the multi-channel data-acquisition electronic unit, and configured to detect a current three-dimensional motion posture of the digital receiving cable and send the motion posture to the multi-channel data-acquisition electronic unit;

a depth gage, connected to the multi-channel data-acquisition electronic unit, and configured to measure the depth by which the digital receiving cable submerges near the sea bottom, and send the depth to the multi-channel data-acquisition electronic unit; and a height gage, connected to the multi-channel data-acquisition electronic unit, and configured to measure the linear length of the digital receiving cable and send the length to the multi-channel data-acquisition electronic unit; and the multi-channel data-acquisition electronic unit is further configured to perform data compilation and arrangement on the reflection information, the position information, the depth, and the linear length, to convert the data into an optical signal.

5. The near-sea-bottom hydrate detection system according to claim 4, wherein the deep-towing part further comprises:

a photoelectric composite connector, disposed between the multi-channel data-acquisition electronic unit and the digital receiving cable.

6. The near-sea-bottom hydrate detection system according to claim 4, wherein the digital receiving cable further comprises:

a filter amplifier, connected to the hydrophone array, and configured to filter and amplify the reflected wave; and an A/D conversion module, connected to the filter amplifier and the multi-channel data-acquisition electronic unit separately, and configured to convert an analog signal of the reflected wave processed by the filter amplifier into a digital signal, and send the digital signal to the multi-channel data-acquisition electronic unit.

7. The near-sea-bottom hydrate detection system according to claim 6, wherein the interval set for the hydrophone array is 50 m.

8. The near-sea-bottom hydrate detection system according to claim 1, wherein the detection system further comprises a towing body, and the deep-towing part is fixed on the towing body, wherein the towing body comprises a main frame, a diversion hood and balancing tail fins;

the diversion hood is disposed on the head end of the main frame, the electric spark vibration source is disposed inside the main frame, and the balancing tail fins are separately disposed on two sides of the tail end of the main frame; and the data acquisition unit is disposed inside the diversion hood.

9. The near-sea-bottom hydrate detection system according to claim 1, wherein the ship-borne part further comprises: a GPS navigation unit, an ultra-short base line positioning unit, a storage unit, and a display array, the GPS navigation unit, the ultra-short base line positioning unit, the storage unit, and the display array being separately connected to the comprehensive monitoring host.

10. The near-sea-bottom hydrate detection system according to claim 1, wherein the detection system further comprises:

a photoelectric composite towrope, disposed between the comprehensive monitoring host and the data acquisition unit, and configured to perform information interaction.

* * * * *